Patented Feb. 26, 1935

1,992,489

UNITED STATES PATENT OFFICE 1,992,489

PROCESS FOR PRODUCING NITROGENEOUS PRODUCTS OF THE ALIPHATIC SERIES

Karl Keller, Frankfort-on-the-Main-Fechenheim, Germany, assignor to General Aniline Works, Inc., New York, N. Y., a corporation of Delaware No Drawing. Application August 5, 1932, Serial No. 627,673. In Germany October 9, 1931

6 Claims. (Cl. 260—127)

My present invention has for its object a process for producing nitrogeneous products of the aliphatic series.

My application Serial No. 418,419, filed January 3, 1930, which has matured into U. S. Patent No. 1,948,924 of February 27, 1934, describes the manufacture of derivatives of paraffin hydrocarbons containing at least 9 carbon atoms, by acting with ammonia in aqueous or alcoholic solution or with an agent yielding ammonia on halogenated derivatives of the said paraffin hydrocarbons containing at least 2 halogen atoms.

In many cases the bases obtained according to the above process still contain a part of the halogen originally present in the molecule of the initial materials. This residual halogen can also be eliminated, for example, by repeating the action of the ammonia solution until the bases are practically free from halogen.

In accordance with my present invention bases of a lower halogen content or which are entirely free from halogen can be obtained in another very simple manner by subjecting the bases which still contain halogen of my said Patent No. 1,948,924 to a pyrogenic process. The bases thus obtained differ in their properties from the bases which are free from halogen or only of small halogen content, obtainable according to my Patent No. 1,948,924.

The present process may be carried out in such a manner that the bases still containing halogen are subjected to treatment as such or with the addition of a suitable catalyst and/or a suitable diluent at a temperature ranging from about 200–300° C. at ordinary or elevated pressure. By this treatment the halogen still combined with the bases is split off in the form of hydrohalic acid which is simultaneously bound with salt formation by the basic groups, so that at the end of the reaction the water-insoluble base is converted into a water-soluble hydrohalide. The free bases may be obtained in a pure state from the aqueous solution by precipitating with a caustic alkali solution, separating by filtration, washing with water and drying. In some cases, in addition to these bases which are of primary, secondary and tertiary type and are in a free state water-insoluble, apparently also further small quantities of quaternary ammonium compounds are formed which are mostly unstable and which may be removed by shaking with water either the mixture of the bases themselves or, for example, ethereal solutions thereof. For most of the purposes of application of the pyrobases obtained according to my present process it is not necessary to remove these quaternary constituents.

Instead of the free bases in some cases also their corresponding neutral or basic salts may be used as starting materials. Of course in these cases the separation of the hydrogen halide takes place with more difficulty. Especially when neutral salts are employed it is advisable to add an acid-binding medium, for example, sodium carbonate, sodium acetate or dimethylaniline.

The bases obtained according to the present process differ from the starting bases not only by their reduced content of halogen, but by a more strongly unsaturated character, involving an increased reaction capacity compared with the starting bases.

The bases obtainable according to the present process and also their salts with organic or inorganic acids represent valuable auxiliary agents for the textile industry. The aqueous solutions of these salts possess wetting, dispersing and softening capacities and are especially distinguished by an ability to improve the fastness of substantive dyeings to boiling water and acid.

By treatment with suitable agents they may be converted into other substances which are valuable in the textile industry, as, for example, by sulfonation or by condensation with the sodium salt of chlorethanolsulfonic acid.

In order to further illustrate my invention the following examples are given the parts being by weight; but I wish it to be understood that my invention is not limited to the examples given, nor to the exact conditions stated therein.

Example 1

62 parts of the base containing 8.2% of chlorine and 4.7% of nitrogen, obtained according to the process of my Patent No. 1,948,924 by the action of alcoholic ammonia on tetrachlorinated hard paraffin, are heated while stirring to 200–215° C. in an oil-bath for about 2–3 hours. After a short time the reaction mass becomes water-soluble. The basic hydrochloride obtained in this manner may be used directly for many purposes.

In order to produce the free base the reaction product is dissolved in water, the free base is precipitated by means of a caustic alkali solution, separated from the salt-water by filtration, washed with water and dried. 56 parts of a thinly liquid, brownish oil which is found to be practically free from chlorine are thus obtained.

The difference between the composition of the starting base and that of the pyro-base obtained therefrom is shown in the following table:

|  | Content of chlorine | Content of nitrogen | Iodine number |
|---|---|---|---|
|  | Per cent | Per cent |  |
| Starting base | 8.2 | 4.7 | 62 |
| Pyro-base | 0.1 | 5.1 | 109 |

The new base is easily soluble in inorganic and organic acids. The solutions of its salts possess the properties described above.

Example 2

60 parts of a base obtained by heating a dichlorinated derivative of hard paraffin with an alcoholic ammonia solution for several hours in a closed vessel at 160 to 170° C. are dissolved in about 200 parts of monochlorobenzene and the solution is heated in a closed vessel for 4 to 5 hours at 250 to 255° C. Then the monochlorobenzene is removed by distillation in vacuo, the residual oil is mixed with water and the free base is isolated by adding a caustic soda solution and dried. In this manner about 55 parts of a thinly liquid, light brown oil is obtained, which is soluble in dilute organic and inorganic acids.

The difference between the composition of the starting base and that of the pyro-base obtained therefrom is shown in the following table:

|  | Content of chlorine | Content of nitrogen | Iodine number |
|---|---|---|---|
|  | Per cent | Per cent |  |
| Starting base | 5.1 | 3.7 | 41 |
| Pyro-base | 1.6 | 3.8 | 66 |

Example 3

62 parts of a base obtainable by heating a hexachlorinated derivative of hard paraffin with a solution of ammonia in methanol for several hours at 140–150° C., which base still contains 9.8% of chlorine and 6.6% of nitrogen, are heated with the addition of 0.5 part of copper powder while stirring for 2 to 3 hours in an oil bath at 210–220° C. When cool the resultant hydrochloride of the base is dissolved in water, the solution is purified by filtration and the free base is isolated therefrom by adding a caustic soda solution. About 55 parts of a yellowish-brown, viscous oil are thus obtained, having a content of only 2.5% of chlorine and of 6.8% of nitrogen. Its iodine number is 92, whereas that of the starting base is 65.

When using as catalyst instead of the copper powder 0.5 part of lead oxide, a pyro-base is obtained containing 6.8% of nitrogen and 1.7% of chlorine the iodine number being 98.

Example 4

62 parts of the base used in Example 1 are mixed with 18 parts of dimethylaniline and the mixture is heated for about 3 hours in an oil bath at 210 to 212° C. to nearly the boiling point. When cool the resultant water-soluble reaction product is dissolved in water, a caustic soda solution is added until an alkaline reaction is obtained and the reaction mass is then subjected to a steam distillation until all of dimethylaniline is expelled. The remaining pyro-base is removed from the aqueous solution, washed out with water and dried in vacuo. About 54 parts of the pyro-base are thus obtained. The following table illustrates its analytic data compared with those of the starting base:

|  | Content of chlorine | Content of nitrogen | Iodine number |
|---|---|---|---|
|  | Per cent | Per cent |  |
| Starting base | 8.2 | 4.7 | 62 |
| Pyro-base | 1.3 | 5.1 | 98.5 |

Example 5

63 parts of the basic hydrochloride of a base obtainable by decomposing a trichlorinated derivative of hard paraffin with an ammonia solution are mixed with 16 parts of anhydrous sodium carbonate and the mixture is heated while stirring in an oilbath for 4 to 5 hours at 210 to 220° C. When cool the reaction mass is repeatedly extracted with water and the resultant oil is isolated and dried in vacuo. About 57 parts of a pyro-base in the form of a light-brown, viscous oil is obtained, of which the analytic data are given in the following table:

|  | Content of chlorine | Content of nitrogen | Iodine number |
|---|---|---|---|
|  | Per cent | Per cent |  |
| Starting base | 8.6 | 4.4 | 34 |
| Pyro-base | 3.0 | 4.5 | 49 |

When heating said hydrochloride with the addition of, for instance, dimethylaniline or pyridine the pyro-base obtained is characterized by a lower content of chlorine and a higher iodine number.

I claim:

1. A process for producing amino-nitrogen containing products of the aliphatic series which comprises subjecting to a pyrogenic process at temperatures ranging from 200 to 300° C. the bases obtained by acting with ammonia on chlorinated derivatives of paraffin hydrocarbons containing at least 9 carbon and 2 chlorine atoms and isolating the pyro-base as such by adding an alkaline solution to the primarily formed aqueous solutions of their alkali metal salts.

2. A process for producing amino-nitrogen containing products of the aliphatic series which comprises subjecting to a pyrogenic process at temperatures ranging from 200 to 300° C. the bases obtained by acting with ammonia on chlorinated derivatives of paraffin hydrocarbons containing at least 9 carbon and 2 chlorine atoms.

3. A process for producing amino-nitrogen containing products of the aliphatic series which comprises subjecting to a pyrogenic process at temperatures ranging from 200 to 300° C. in the presence of an inert organic diluent the bases obtained by acting with ammonia on halogenated derivatives of paraffin hydrocarbons containing at least 9 carbon and 2 chlorine atoms.

4. A process for producing amino-nitrogen containing products of the aliphatic series which comprises subjecting to a pyrogenic process at temperatures ranging from 200 to 300° C. in the presence of an inert organic diluent and of a catalyst of the group consisting of copper powder and lead oxide, the bases obtained by acting with ammonia on chlorinated derivatives of paraffin hydrocarbons containing at least 9 carbon and 2 chlorine atoms.

5. A process for producing amino-nitrogen containing products of the aliphatic series which comprises heating addition salts of the bases obtained by acting with ammonia on chlorinated derivatives of paraffin hydrocarbons containing at least 9 carbon and 2 chlorine atoms at temperatures ranging from 200 to 300° C. in the presence of an acid binding agent.

6. The amino-nitrogen containing derivative of hard paraffin, which in the form of its free base is a viscous, light-brownish oil containing 3% of chlorine and 4.5% of nitrogen, the iodine number being 49, which product is obtained by subjecting to a pyrogenic process at temperatures ranging from 200 to 300° C. the nitrogeneous reaction product of ammonia on trichlorhardparaffin, which initial product contains 8.6% of chlorine and 4.4% of nitrogen, the iodine number being 34.

KARL KELLER.